(12) United States Patent
Ueki

(10) Patent No.: US 11,132,597 B2
(45) Date of Patent: Sep. 28, 2021

(54) RFID TAG READING ANTENNA

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/130,372

(22) Filed: Dec. 22, 2020

(65) Prior Publication Data

US 2021/0110232 A1    Apr. 15, 2021

Related U.S. Application Data

(63) Continuation of application No. PCT/JP2019/006437, filed on Feb. 21, 2019.

(30) Foreign Application Priority Data

Jul. 24, 2018    (JP) .............................. JP2018-138264

(51) Int. Cl.
    *G06K 19/077*    (2006.01)
    *G06K 7/10*    (2006.01)
    (Continued)

(52) U.S. Cl.
    CPC ...  *G06K 19/07773* (2013.01); *G06K 7/10158* (2013.01); *G06K 19/0723* (2013.01); *H01Q 7/00* (2013.01)

(58) Field of Classification Search
    CPC ......... G06K 19/07773; G06K 7/10158; G06K 19/0723; H01Q 7/00
    (Continued)

(56) References Cited

U.S. PATENT DOCUMENTS 7,728,785 B2 * 6/2010 Ozden .................... H01Q 7/00
                                                    343/866
9,727,765 B2    8/2017 Ikemoto
(Continued)

FOREIGN PATENT DOCUMENTS

JP    2000138621 A    5/2000
JP    2001024548 A    1/2001
(Continued)

OTHER PUBLICATIONS

International Search Report issued for PCT/JP2019/006437, dated Apr. 23, 2019.
(Continued)

*Primary Examiner* — Michael G Lee
*Assistant Examiner* — David Tardif
(74) *Attorney, Agent, or Firm* — Arent Fox LLP

(57) ABSTRACT

An RFID tag reading antenna includes a loop antenna including a first loop-shaped conductor having a peripheral length shorter than a ¼ wavelength in a communication frequency; and a split ring resonator including a second loop-shaped conductor having an opening smaller than an opening of the first loop-shaped conductor of the loop antenna and being arranged at a position away from a plane formed by the first loop-shaped conductor by a predetermined distance. In addition, the RFID tag reading antenna is coupled to an RFID tag as a communication partner, in a state where a distance from the RFID tag to the split ring resonator is shorter than a distance from the loop antenna to the split ring resonator.

20 Claims, 18 Drawing Sheets

(51) Int. Cl.
   *G06K 19/07*      (2006.01)
   *H01Q 7/00*       (2006.01)
(58) Field of Classification Search
   USPC ......................................................... 235/492
   See application file for complete search history.

(56)         References Cited

U.S. PATENT DOCUMENTS

| 10,007,817 | B2  | 6/2018  | Ikemoto    |            |
| 10,333,225 | B1* | 6/2019  | Kanagasabai | H01Q 5/25 |
| 10,374,285 | B2  | 8/2019  | Miura      |            |
| 2012/0162020 | A1* | 6/2012 | Fukunaga  | H01Q 9/04  |
| | | | | 343/700 MS |
| 2012/0206239 | A1 | 8/2012 | Ikemoto | |
| 2016/0190676 | A1 | 6/2016 | Miura | |
| 2017/0046544 | A1 | 2/2017 | Ikemoto | |
| 2018/0090833 | A1* | 3/2018 | Kosaka | H01Q 19/10 |
| 2018/0276429 | A1 | 9/2018 | Ikemoto | |
| 2018/0287268 | A1* | 10/2018 | Kosaka | H01Q 21/061 |
| 2019/0115954 | A1 | 4/2019 | Omori et al. | |

FOREIGN PATENT DOCUMENTS

| JP | 2003069335 | A  | 3/2003  |
| JP | 2005323019 | A  | 11/2005 |
| JP | 2007043245 | A  | 2/2007  |
| JP | 2015046681 | A  | 3/2015  |
| WO | 2011118379 | A1 | 9/2011  |
| WO | 2018003362 | A1 | 1/2018  |

OTHER PUBLICATIONS

Written Opinion of the International Searching Authority issued for PCT/JP2019/006437, dated Apr. 23, 2019.

* cited by examiner

RFID TAG READING ANTENNA

CROSS REFERENCE TO RELATED APPLICATIONS

The present application is a continuation of PCT/JP2019/006437 filed Feb. 21, 2019, which claims priority to Japanese Patent Application No. 2018-138264, filed Jul. 24, 2018, the entire contents of each of which are incorporated herein by reference.

TECHNICAL FIELD

The present invention relates to an RFID tag reading antenna constructed for reading RFID tag information by coupling to an RFID tag or the like.

BACKGROUND

International Publication No. 2011/118379 (hereinafter referred to as "Patent Literature 1") discloses a small magnetic field-coupling type RFID tag and a reader/writer antenna using a loop antenna. Specifically, a coil antenna is provided in which a plurality of coil-shaped conductors are laminated for the RFID tag, and a conductor width of a loop-shaped conductor in the loop antenna is designed to be larger than the conductor widths of the coil-shaped conductors in the coil antenna, so that a conductor loss in the loop antenna is suppressed, and a magnetic flux is concentrated on a center line of a winding axis of the loop antenna. Further, a stray capacitance generated between the coil-shaped conductors of the coil antenna of the RFID tag and a metal object is minimized, so that the degree of coupling between the RFID tag and the reader/writer can be improved.

As usage patterns of the RFID tag, there are cases where recorded information of the RFID tag is read or predetermined information is written in the RFID tag at a position relatively away from the RFID tag, and cases where reading/writing is performed in contact with or in close proximity to the RFID tag.

Further, as an attachment structure of the RFID tag to an article, there is a case where the RFID tag is attached to a surface of an insulator or dielectric member or embedded inside, and there is a case where the RFID tag is attached to a surface of a metal member or arranged inside.

The RFID tag reading antenna described in Patent Literature 1 is a small loop antenna, and thus is an antenna that is coupled to a magnetic field-coupling type RFID tag, but may not be able to communicate with a magnetic field-coupling type RFID tag that is attached to a surface of a metal member or arranged inside. This is because, when the small loop antenna is close to the RFID tag, the small loop antenna is also close to the metal, and the resonance frequency of the small loop antenna is greatly displaced from a predetermined frequency, so that power for communication through a magnetic field is reduced.

SUMMARY OF THE INVENTION

Therefore, the exemplary embodiments of the present invention provide an RFID tag reading antenna constructed for communicating even in close proximity to an RFID tag arranged on a surface of or inside a metal member.

According to an exemplary aspect, an RFID tag reading antenna is provided that includes a loop antenna including a first loop-shaped conductor having a peripheral length shorter than a ¼ wavelength in a communication frequency; and a resonator including a second loop-shaped conductor having an opening smaller than an opening of the first loop-shaped conductor of the small loop antenna and being arranged at a position away from a plane formed by the first loop-shaped conductor by a predetermined distance.

Moreover, the RFID tag reading antenna is coupled to an RFID tag as a communication partner, in a state where a distance from the RFID tag to the resonator is shorter than a distance from the loop antenna to the resonator.

According to the above-described configuration, the loop antenna is not significantly affected by the metal member on or in which the RFID tag is provided, and therefore the resonance frequency is minimally displaced if at all. On the other hand, although the resonator is close to the metal member, the resonator has a smaller opening diameter than that of the loop antenna. Thus, the resonator is coupled to the RFID tag in a state of being less liable to be affected by the metal member. Since the resonator is coupled to the loop antenna, the loop antenna can eventually communicate with the RFID tag via the resonator.

According to the exemplary embodiments of the present invention, an RFID tag reading antenna is provided that is configured for communicating even in close proximity to the RFID tag arranged on the surface of or inside the metal member.

DETAILED DESCRIPTION OF EMBODIMENTS

First, configurations of various exemplary aspects of a wireless communication device according to the present disclosure will be described.

An RFID tag reading antenna according to a first exemplary aspect includes a loop antenna and a resonator. The loop antenna includes a first loop-shaped conductor having a peripheral length shorter than a ¼ wavelength. The resonator includes a second loop-shaped conductor having an opening smaller than an opening of the first loop-shaped conductor of the loop antenna and being arranged at a position away from a plane formed by the first loop-shaped conductor of the loop antenna by a predetermined distance. The RFID tag reading antenna is coupled to an RFID tag as a communication partner, in a state where a distance from the resonator to the RFID tag is shorter than a distance from the loop antenna to the resonator.

In an RFID tag reading antenna according to a second exemplary aspect, the resonator is arranged on a line perpendicular to a plane formed by the first loop-shaped conductor of the loop antenna and passing through a center of the first loop-shaped conductor. That is, the first loop-shaped conductor of the loop antenna and the second loop-shaped conductor of the resonator are arranged in a coaxial relationship.

In an RFID tag reading antenna according to a third exemplary aspect, the resonator includes a plurality of resonators, and a plane formed by the second loop-shaped conductor of the resonator is arranged in a parallel relationship to the plane formed by the first loop-shaped conductor of the loop antenna.

In an RFID tag reading antenna according to a fourth exemplary aspect, a shape of the second loop-shaped conductor is a quadrangle having sides along two-axis directions orthogonal to each other, and the plurality of resonators are arranged in the two-axis directions.

In an RFID tag reading antenna according to a fifth exemplary aspect, the second loop-shaped conductor is a ring-shaped conductor having a slit in a part thereof, and the resonator is a split ring resonator.

In an RFID tag reading antenna according to a sixth exemplary aspect, an interval between the loop antenna and the resonator is determined so that a magnetic field strength at a position of the resonator is higher than a magnetic field strength at a center position of the loop antenna.

First Exemplary Embodiment

Figure 1A:
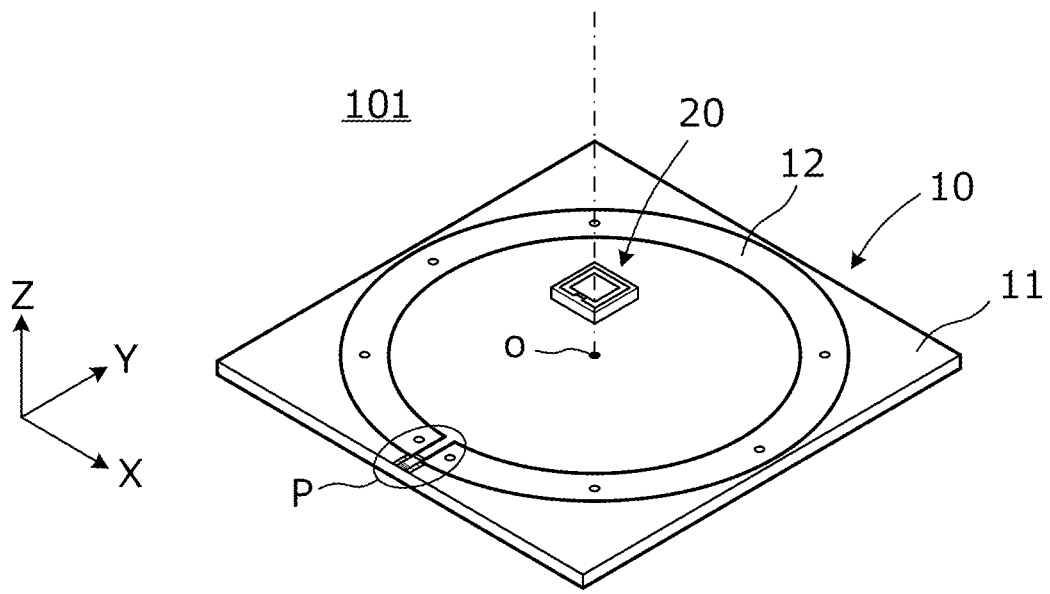
FIG. 1A is a perspective view of an RFID tag reading antenna 101 according to a first exemplary embodiment.
Figure 1B:
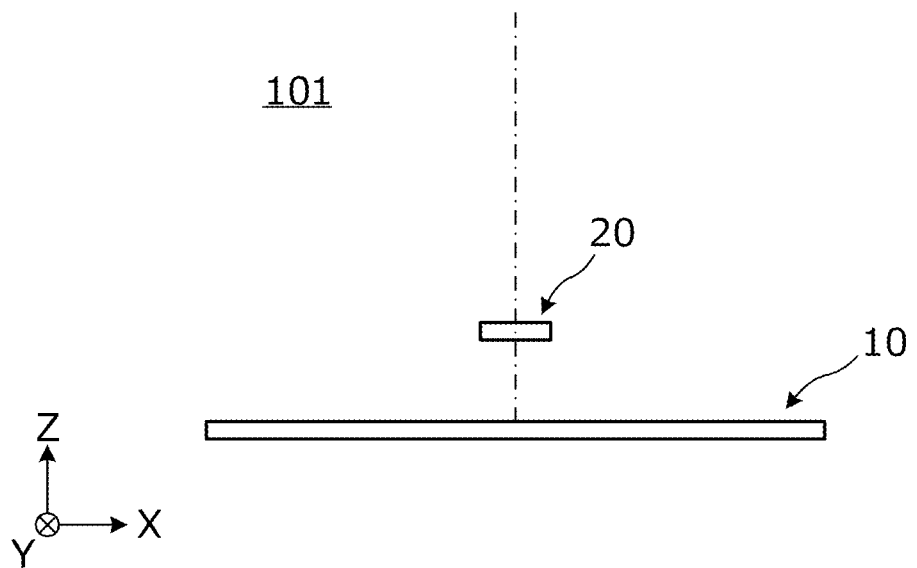
FIG. 1B is a front view of the RFID tag reading antenna 101.

FIG. 1A is a perspective view of an RFID tag reading antenna 101 according to a first embodiment. FIG. 1B is a front view of the RFID tag reading antenna 101.

The RFID tag reading antenna 101 includes a small loop antenna 10 (generally referred to as a loop antenna) and a split ring resonator 20. The small loop antenna 10 includes an insulator or dielectric substrate 11 and a first loop-shaped conductor 12 formed or otherwise disposed on the substrate 11. The first loop-shaped conductor 12 is a conductor having a circular ring shape with a peripheral length shorter than a ¼ wavelength in the communication frequency for the RFID tag. The start and end of the loop of the first loop-shaped conductor 12 configure an input/output port P of the small loop antenna 10.

The split ring resonator 20 is arranged or otherwise disposed on a line perpendicular to the plane formed by the first loop-shaped conductor 12 of the small loop antenna 10, that is, the main surface of the substrate 11, and passing through a center O of the first loop-shaped conductor 12.

Figure 2:
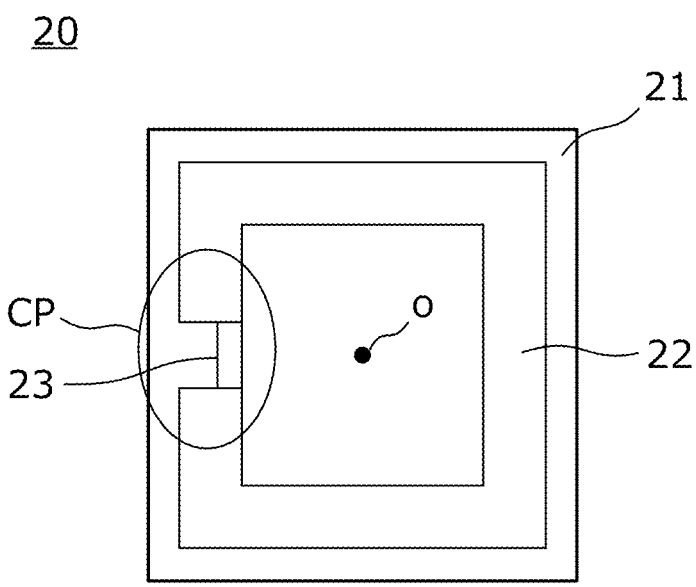
FIG. 2 is a plan view of a split ring resonator 20.

FIG. 2 is a plan view of the split ring resonator 20. The split ring resonator 20 includes an insulating substrate 21 and a second loop-shaped conductor 22 formed or otherwise disposed on the substrate 21. The second loop-shaped conductor 22 is a conductor having a square ring shape. The start and end of the second loop-shaped conductor 22 are a capacitive loading portion CP. In this example, a capacitor 23 is connected to the capacitive loading portion CP. That is, the start and end of the second loop-shaped conductor 22 are connected via the capacitor 23.

The main surface of the substrate 21 of the split ring resonator 20 and the main surface of the substrate 11 of the small loop antenna 10 are parallel to each other (e.g., in the X-Y plane). Further, a perpendicular line to the main surface of the substrate 11 passes through a center O of the second loop-shaped conductor 22 of the split ring resonator 20 and the center O of the first loop-shaped conductor 12 of the small loop antenna 10. That is, the first loop-shaped conductor 12 of the small loop antenna 10 and the second loop-shaped conductor 22 of the split ring resonator 20 are in a coaxial relationship with each other.

Figure 3:
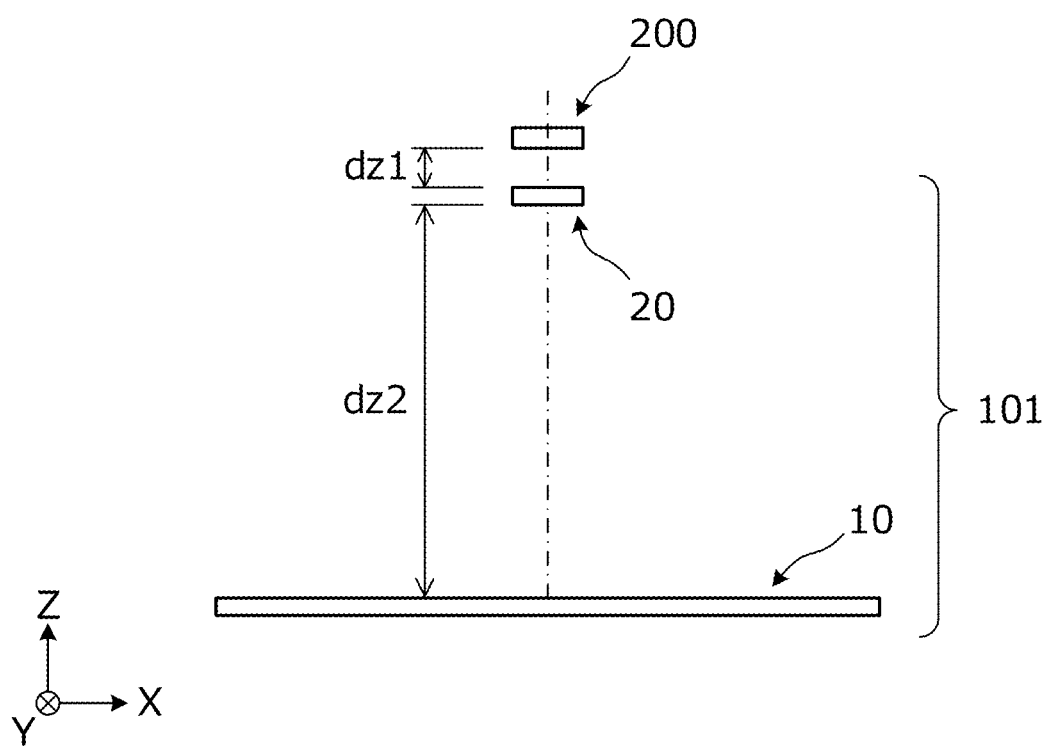
FIG. 3 is a front view showing an example of the positional relationship between the RFID tag reading antenna 101 and an RFID tag 200 attached to an article.

FIG. 3 is a front view showing an example of the positional relationship between the RFID tag reading antenna 101 and an RFID tag 200 attached to an article (not shown). Typically, the RFID tag 200 and the split ring resonator 20 are brought close to each other so that the RFID tag 200 is located on the line connecting the center O (see FIG. 1A) of the first loop-shaped conductor 12 of the small loop antenna 10 and the center O (see FIG. 2) of the second loop-shaped conductor 22 of the split ring resonator 20. A typical configuration of the RFID tag 200 is as disclosed in Patent Literature 1 discussed above.

Here, when the distance from the small loop antenna 10 to the split ring resonator 20 is represented by dz2, and the distance from the split ring resonator 20 to the RFID tag 200 is represented by dz1, the small loop antenna 10, the split ring resonator 20, and the RFID tag 200 have a positional relationship of dz1<dz2.

Figure 4A:
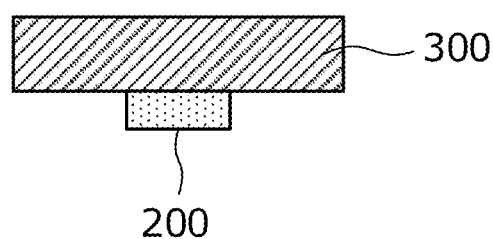
FIGS. 4A and 4B are cross-sectional views showing examples of an article with the RFID tag 200 attached.
Figure 4B:
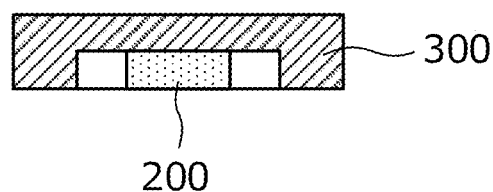

FIGS. 4A and 4B are cross-sectional views showing examples of an article with the RFID tag 200 attached. In an article 301 shown in FIG. 4A, the RFID tag 200 is attached to a surface of a metal member 300. In an article 302 shown in FIG. 4B, the RFID tag 200 is arranged in a recess of the metal member 300. That is, the RFID tag 200 is arranged inside the metal member 300.

According to the exemplary aspect, the small loop antenna 10 of the RFID tag reading antenna 101 having the above configuration is located at a position sufficiently away from the metal member 300 on or in which the RFID tag 200 is provided, and hence is not significantly affected by the metal member 300. Therefore, the resonance frequency of the small loop antenna 10 maintains a predetermined frequency. On the other hand, although the split ring resonator 20 is close to the metal member 300, the split ring resonator 20 has a smaller opening diameter of the second loop-shaped conductor 22 than that of the small loop antenna 10. Thus, the split ring resonator 20 is coupled to the RFID tag 200 in a state of being less likely to be affected by the metal member 300. Since the split ring resonator 20 is magnetically coupled to the small loop antenna 10, the small loop antenna 10 can eventually communicate with the RFID tag 200 via the split ring resonator 20.

As described above, even in the articles 301 and 302 having the metal member 300, the RFID tag reading antenna 101 of the present embodiment is configured to communicate with the RFID tag 200 attached to the articles 301 and 302.

Figure 5:
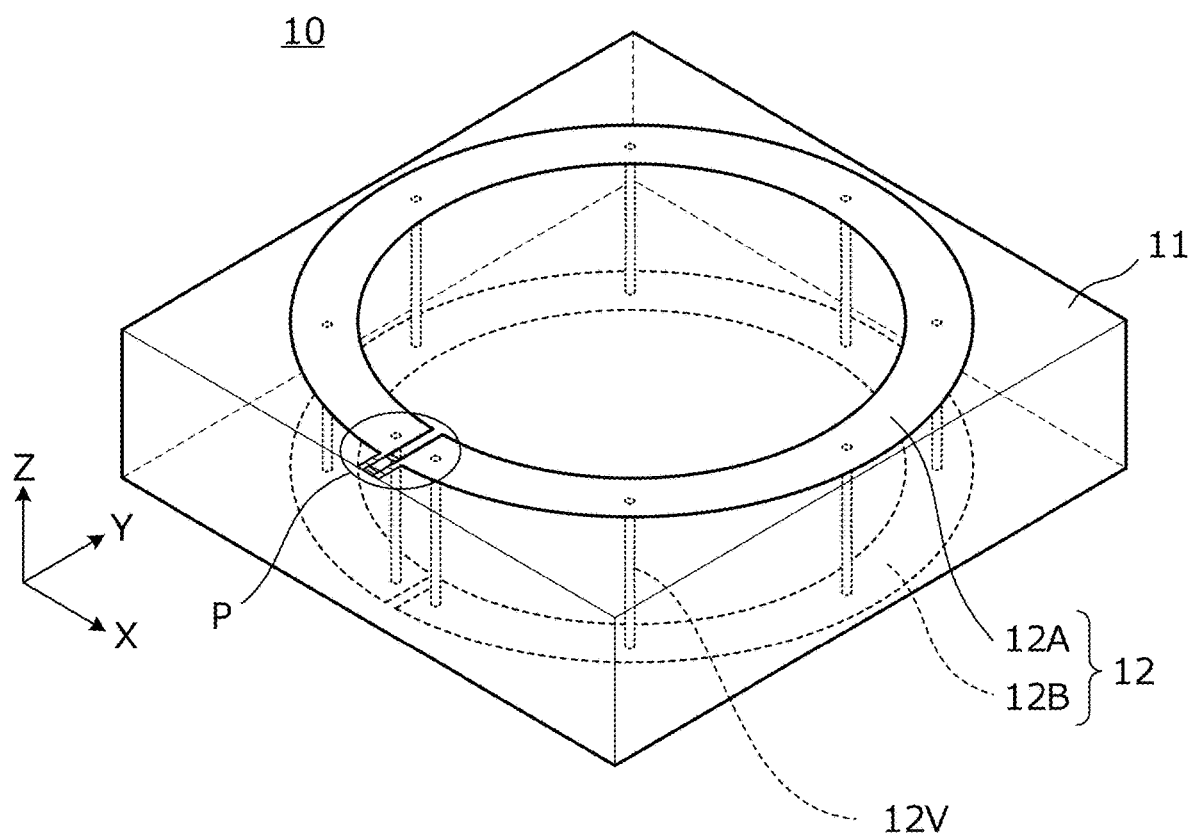
FIG. 5 is a perspective view showing a configuration of a first loop-shaped conductor 12 of a small loop antenna 10.

FIG. 5 is a perspective view showing the configuration of the first loop-shaped conductor 12 of the small loop antenna 10. In FIG. 5, the magnification in the thickness direction (e.g., the Z-axis direction) of the substrate 11 is shown to be 10 times higher than the magnification in the plane direction (e.g., the X-axis direction and Y-axis direction). The substrate 11 is, for example, a glass epoxy substrate having a thickness of 0.8 mm. A first loop-shaped conductor 12A is formed on the upper surface of the substrate 11, and a first loop-shaped conductor 12B is formed on the lower surface of the substrate 11. In an exemplary aspect, the first loop-shaped conductors 12A and 12B are each provided by patterning Cu foil and have a circular ring shape with an outer diameter of 30.5 mm and an inner diameter of 24.5 mm. The first loop-shaped conductors 12A and 12B overlap as a whole when the substrate 11 is viewed in a plane (i.e., when viewed in the Z-axis direction).

The first loop-shaped conductors 12A and 12B are electrically connected via a plurality of interlayer connecting conductors 12V. These interlayer connecting conductors 12V are, for example, through holes with a Cu plating film formed on the inner surface thereof.

Figure 6:
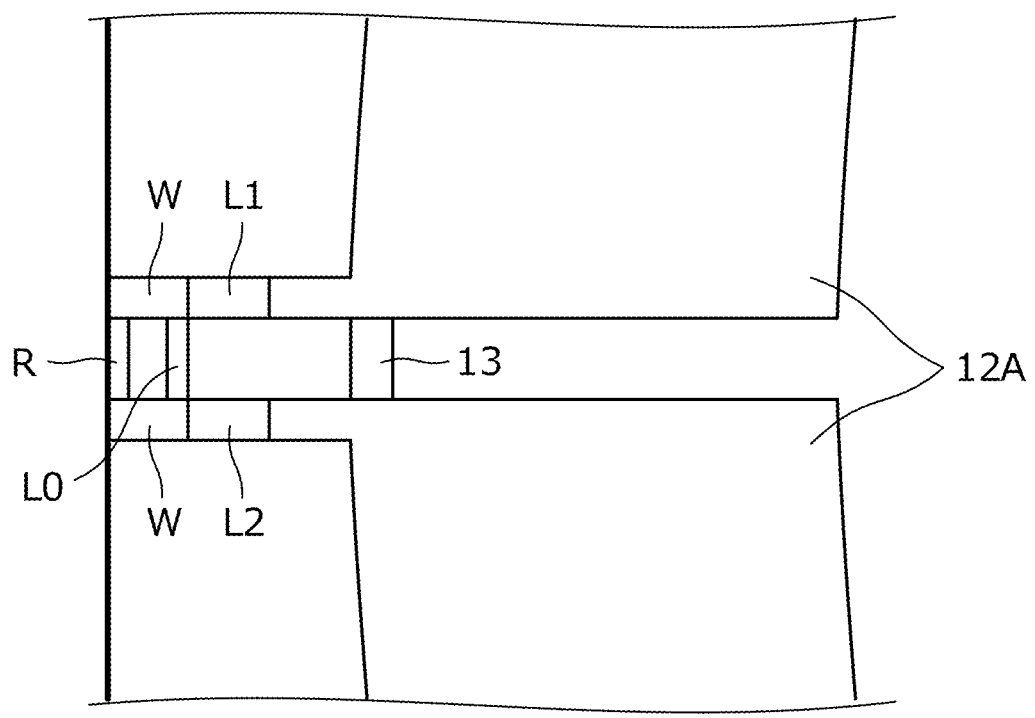
FIG. 6 is a partial plan view showing a configuration of an input/output port portion of the small loop antenna 10.

FIG. 6 is a partial plan view showing the configuration of the input/output port P portion (see FIG. 1A) of the small loop antenna 10. The start and end of the first loop-shaped conductor 12A are connected via a capacitor 13. One end of a balanced transmission line is connected to the start and end of the first loop-shaped conductor 12A. The small loop antenna 10 and a communication circuit are connected via the balanced transmission line. In FIG. 6, inductors L0, L1 and L2 for impedance matching are connected. A terminating resistor R of 50Ω for simulation is connected to the ends of wirings W and W. For example, the capacitor 13 is 1 pF, the inductor L0 is 2 nH, and the inductors L1 and L2 are each 23 nH.

The small loop antenna 10 includes the first loop-shaped conductors 12A and 12B, the interlayer connecting conductor 12V, and the capacitor 13. The resonance frequency of this small loop antenna 10 is, for example, 864 MHz in an exemplary aspect.

In the example shown in FIG. 5, the small loop antenna 10 includes the first loop-shaped conductor 12 having a circular ring shape, but may have a loop-shaped conductor of various shapes such as a rectangular ring shape, a rhombic ring shape, an elliptical ring shape, and an oval ring shape.

Figure 7:
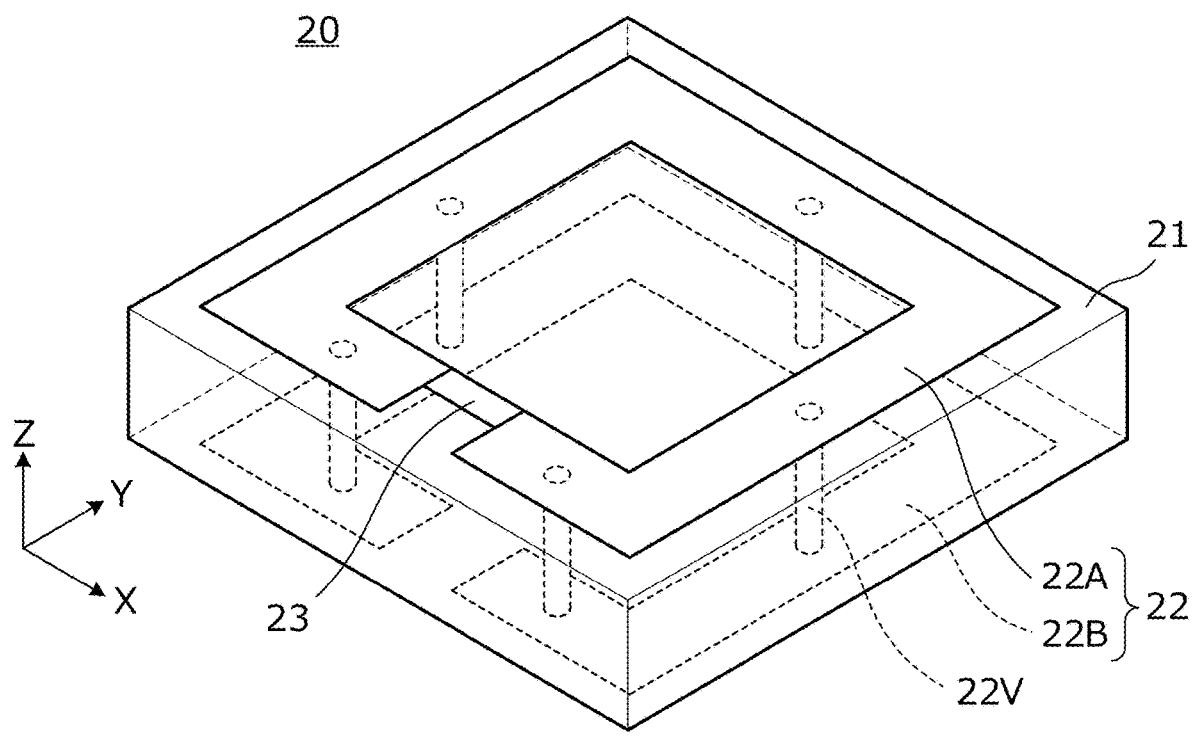
FIG. 7 is a perspective view of the split ring resonator 20.

FIG. 7 is a perspective view of the split ring resonator 20. In FIG. 7, the magnification in the thickness direction (e.g., in the Z-axis direction) of the substrate 21 is the same as the magnification in the plane direction (e.g., in the X-axis direction and Y-axis direction). In FIG. 7, the substrate 21 is, for example, a glass epoxy substrate having a thickness of 0.8 mm. A second loop-shaped conductor 22A is formed on the upper surface of the substrate 21, and a second loop-shaped conductor 22B is formed on the lower surface of the substrate 21. The second loop-shaped conductors 22A and 22B are each provided by patterning Cu foil and have a square ring shape with an outer width of 3 mm and an inner width of 2 mm. The second loop-shaped conductors 22A and 22B overlap as a whole when the substrate 21 is viewed in a plane (i.e., when viewed in the Z-axis direction).

The second loop-shaped conductors 22A and 22B are electrically connected via a plurality of interlayer connecting conductors 22V. These interlayer connecting conductors 22V are, for example, through holes with a Cu plating film formed on the inner surface thereof according to an exemplary aspect.

The start and end of the second loop-shaped conductor 22A are connected via the capacitor 23. The split ring resonator 20 includes the second loop-shaped conductors 22A and 22B, the interlayer connecting conductors 22V, and the capacitor 23. The capacitor 23 is, for example, 11 pF, and the resonance frequency of the split ring resonator 20 is, for example, 864 MHz according to the exemplary aspect.

In the examples shown in FIGS. 2 and 7, the split ring resonator 20 includes the second loop-shaped conductor 22 having a square ring shape, but it is noted that the split ring resonator 20 may have a loop-shaped conductor of various shapes such as a rectangular ring shape, a rhombic ring shape, a circular ring shape, an elliptical ring shape, and an oval ring shape.

Figure 8:
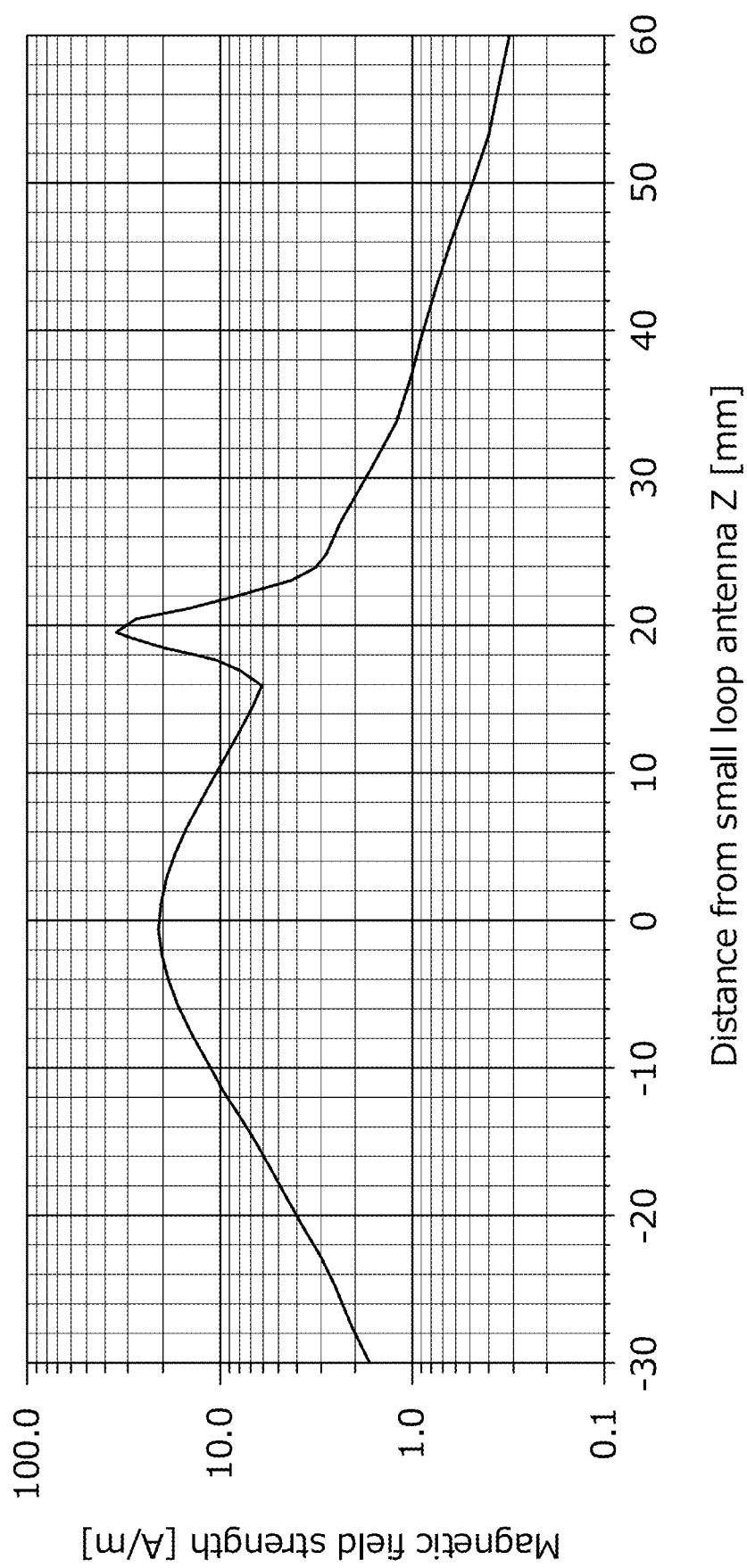
FIG. 8 is a diagram showing the relationship between the position and the magnetic field strength in the RFID tag reading antenna 101.

FIG. 8 is a diagram showing the relationship between the position and the magnetic field strength in the RFID tag reading antenna 101 when the RFID tag reading antenna 101 is configured as shown above. The horizontal axis of FIG. 8 represents the position (in the direction along the Z axis) on the straight line passing through the center O of the first loop-shaped conductor 12 of the small loop antenna 10 and the center O of the second loop-shaped conductor 22 of the split ring resonator 20 shown in FIG. 3, the position of the small loop antenna 10 is represented as 0, and the direction toward the split ring resonator 20 is represented as a positive direction. Hereinafter, the position in the Z-axis direction is represented by "Z". The vertical axis of FIG. 8 represents the magnetic field strength. In this example, the condition is that the magnetic field strength is about 20 A/m at the position of the small loop antenna 10 (Z=0). Further, the split ring resonator 20 is arranged at a position away from the small loop antenna 10 by 19.2 mm. That is, the second loop-shaped conductor 22B at the bottom of the split ring resonator 20 is 19.2 mm away from the small loop antenna 10, and the second loop-shaped conductor 22A at the top of the split ring resonator 20 is 20 mm away from the small loop antenna 10.

Assuming that the split ring resonator 20 is not present, the strength of the magnetic field generated by the small loop antenna 10 peaks at Z=0, and the magnetic field strength decreases as z is away from 0. On the other hand, by providing the split ring resonator 20, the magnetic field strength is improved in the vicinity of the split ring resonator 20. That is, as shown in FIG. 8, the magnetic field strength improves before and after Z=19.5 mm. In the example shown in FIG. 8, the magnetic field strength at Z=19.5 mm is 35 A/m, and is higher than the peak value of the magnetic field strength at Z=0, that is, 20 A/m. In this way, the split ring resonator 20 acts to increase the magnetic field of the small loop antenna at a position away from the small loop antenna 10.

As the split ring resonator 20 is positioned away from the small loop antenna 10, the small loop antenna 10 becomes less likely to be affected by the metal member 300 in the vicinity of the split ring resonator 20, but the coupling coefficient between the small loop antenna 10 and the split ring resonator 20 decreases as the split ring resonator 20 is away from the small loop antenna 10. Therefore, the magnetic field strength at the position of the split ring resonator 20 decreases as the split ring resonator 20 is away from the small loop antenna 10, and the enhancement effect decreases as the split ring resonator 20 is away from the small loop antenna 10.

Therefore, it is preferable to determine the interval between the small loop antenna 10 and the split ring resonator 20 so that the magnetic field strength at the position of the split ring resonator 20 is higher than the magnetic field strength at the center position of the small loop antenna 10. As a result, when the small loop antenna 10 is away from the metal member 300, not only the resonance frequency of the small loop antenna is stabilized, but also the coupling between the small loop antenna 10 and the RFID tag 200 via the split ring resonator 20 can be enhanced, so that communication performance is further improved.

Next, the influence of the proximity of the metal member 300 to the above-mentioned small loop antenna 10 will be described.

Figure 9:
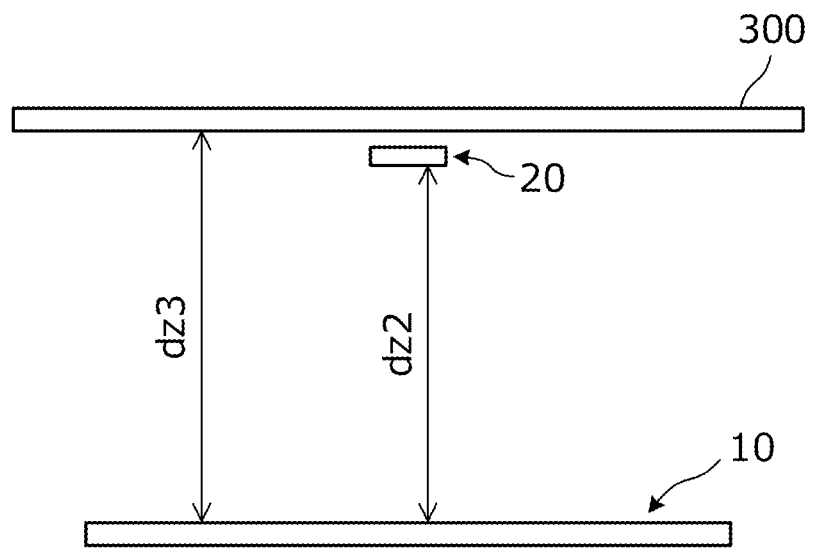
FIG. 9 is a view showing the positional relationship of the small loop antenna 10, the split ring resonator 20, and a metal member 300.

FIG. 9 is a view showing the positional relationship of the small loop antenna 10, the split ring resonator 20, and the metal member 300. When the interval between the small loop antenna 10 and the split ring resonator 20 is represented by dz2, and the interval between the small loop antenna 10 and the metal member 300 is represented by dz3, dz2 equals 18.2 mm and dz3 equals 20 mm. The metal member 300 is a square Cu plate having a size of 40 mm×40 mm.

Figure 10:
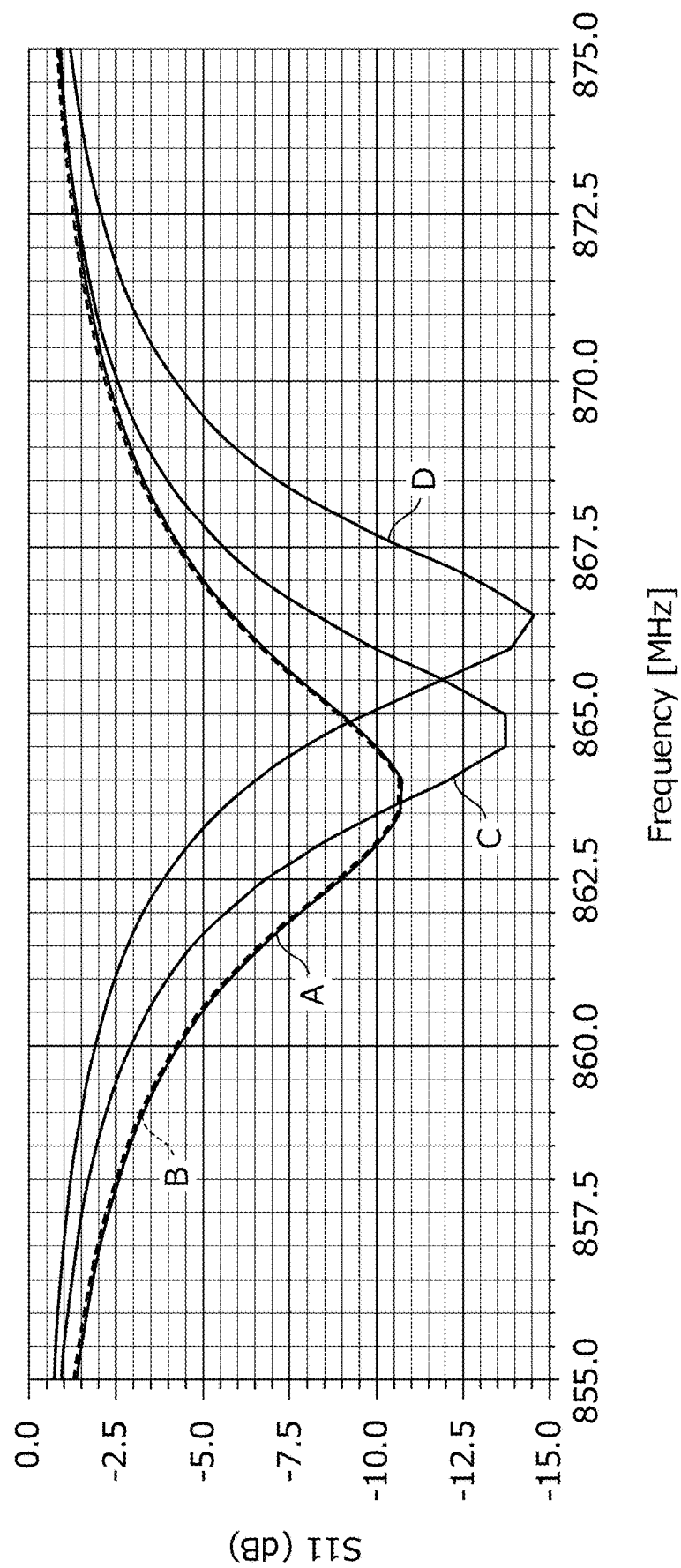
FIG. 10 is a diagram showing the frequency characteristics of the reflection coefficient S11 as seen from an input/output portion of the small loop antenna 10.

FIG. 10 is a diagram showing the frequency characteristics of the reflection coefficient S11 as seen from an input/output portion of the small loop antenna 10. The configurations of the small loop antenna 10 and the split ring resonator 20 are as shown above. In FIG. 10, the characteristic curve A is a characteristic of the small loop antenna 10 alone without the metal member 300 and the split ring resonator 20. The characteristic curve B is a characteristic in a state where the metal member 300 is absent and the split ring resonator 20 is present at the position shown in FIG. 9. The characteristic curve C is a characteristic in a state where the split ring resonator 20 is provided and the metal member 300 is present, and the characteristic curve D is a characteristic in the state where the split ring resonator 20 is absent and the metal member 300 is present.

In the state where the metal member 300 is absent, the resonance frequency of the small loop antenna 10 is 864 MHz, as shown in the characteristic curves A and B. In the state where the split ring resonator 20 is absent and the metal member 300 is present, that is, in an antenna of a conventional structure, the resonance frequency of the small loop antenna 10 is 866.3 MHz as shown in the characteristic curve D. On the other hand, in the RFID tag reading antenna 101 of the present embodiment, the resonance frequency of the small loop antenna 10 is 864.7 MHz as shown in the characteristic curve C.

As shown in FIG. 10, the resonance frequency of the small loop antenna 10 increases (shifts to a high frequency range) due to the proximity of the metal member 300. This effect is because magnetic field lines generated around the first loop-shaped conductor 12 of the small loop antenna 10 are canceled by magnetic field lines generated by eddy current flowing in the metal member 30, and the inductance of the first loop-shaped conductor 12 decreases. However, according to the RFID tag reading antenna 101 of the present embodiment, even though the interval between the small loop antenna 10 and the metal member 300 is the same as the interval in which the characteristic curve D is obtained, the shift amount of the resonance frequency of the small loop antenna 10 is small due to the presence of the split ring resonator 20. This is because the small loop antenna 10 is magnetically coupled to the split ring resonator 20 having a resonance frequency of 864 MHz by itself.

In this way, not only the rise in the resonance frequency of the small loop antenna 10 is suppressed due to the small loop antenna 10 away from the metal member 300, but also the rise in the resonance frequency of the small loop antenna is suppressed due to the presence of the split ring resonator 20.

Since the resonance frequency of the split ring resonator 20 rises due to the proximity of the split ring resonator 20 to the metal member 300, the resonance frequency of the split ring resonator 20 is preferably set to be matched to the resonance frequency of the small loop antenna 10 in anticipation of this rise amount. That is, when the resonance frequency of the small loop antenna 10 in the state where the metal member 300 is close to the split ring resonator 20 is represented by f10, and the resonance frequency of the split ring resonator 20 in the state where the metal member 300 is close to the split ring resonator 20 is represented by f20, it is preferable to determine the resonance frequency of the split ring resonator 20 alone in advance so that the relationship of f20=f10 is satisfied.

Next, an example of a change in the resonance frequency of the small loop antenna 10 due to the interval between the small loop antenna 10 and the metal member 300 will be shown.

Figure 11:
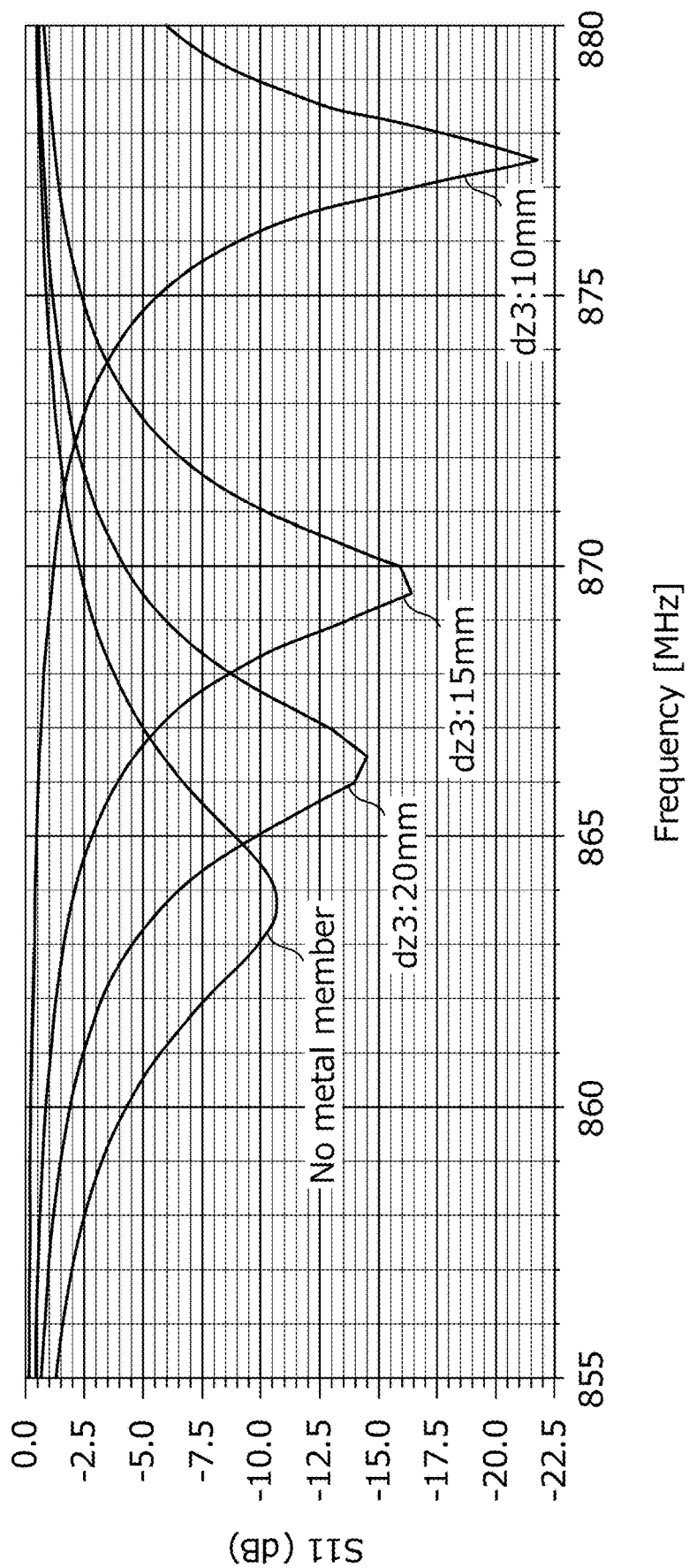
FIG. 11 is a diagram showing the frequency characteristics of the reflection coefficient S11 seen from the input/output portion of the small loop antenna 10 when the interval between the small loop antenna 10 and the metal member 300 is changed.

FIG. 11 is a diagram showing the frequency characteristics of the reflection coefficient S11 seen from the input/output portion of the small loop antenna 10 when the interval between the small loop antenna 10 and the metal member 300 is changed. Here, the metal member 300 is a square Cu plate having a size of 40 mm×40 mm. The configuration of the small loop antenna 10 is as shown above.

As shown in FIG. 11, the resonance frequency in the state where the metal member 300 is absent is 864 MHz as shown in FIG. 10. When the interval between the small loop antenna 10 and the metal member 300 (dz3 shown in FIG. 9) is 20 mm, the resonance frequency of the small loop antenna 10 is 866.5 MHz, when dz3 is 15 mm, the resonance frequency of the small loop antenna 10 is 869.5 MHz, and when dz3 is 10 mm, the resonance frequency of the small loop antenna 10 is 877.5 MHz.

As described above, as the interval between the small loop antenna 10 and the metal member 300 becomes smaller, the resonance frequency of the small loop antenna 10 increases. When this interval dz3 is 10 mm, the resonance frequency of the small loop antenna 10 is displaced by (877.5−864)/864=0.0156, that is, about 16%, but as the interval dz3 increases, the rise amount of the resonance frequency of the small loop antenna 10 is gradually reduced. This is clear from the fact that the displacement amount of the resonance frequency to the change of dz3 by 5 mm from 15 mm to 20 mm is smaller than the displacement amount of the resonance frequency to the change of dz3 by 5 mm from 10 mm to 15 mm. Therefore, the minimum interval between the small loop antenna 10 and the metal member 300, that is, the interval between the small loop antenna 10 and the split ring resonator 20 may be determined so that there is no substantial difference in communication performance between the case where the metal member 300 is present in the article and the case where the metal member 300 is absent in the article. For example, the interval between the small loop antenna 10 and the split ring resonator 20 is set to 20 mm.

In addition to the actions and effects described above, according to the present embodiment, the first loop-shaped conductor 12 of the small loop antenna 10 and the second loop-shaped conductor 22 of the split ring resonator 20 are arranged in a coaxial relationship, and the plane formed by the first loop-shaped conductor 12 and the plane formed by the second loop-shaped conductor 22 are parallel to each other, so that the coupling between the small loop antenna 10 and the split ring resonator 20 can be most effectively enhanced.

Second Exemplary Embodiment

In a second embodiment, an example of an RFID tag reading antenna including a plurality of split ring resonators is shown.

Figure 12:
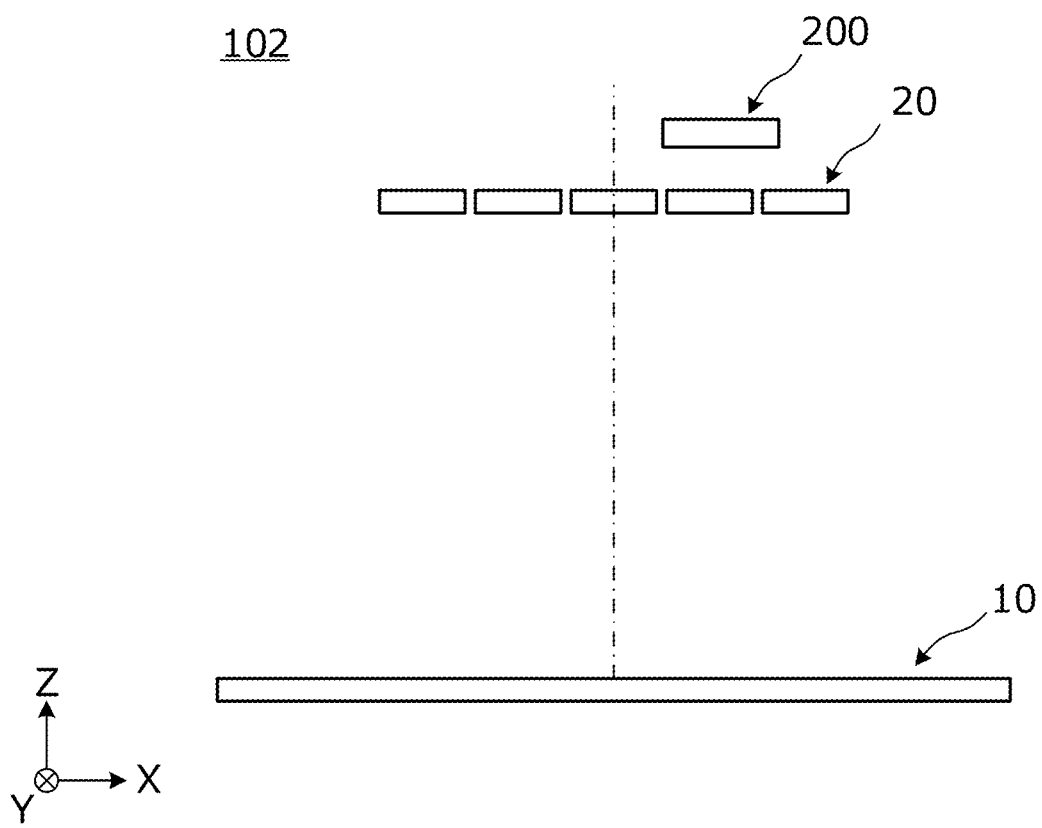
FIG. 12 is a front view of an RFID tag reading antenna 102 according to a second exemplary embodiment.
Figure 13:
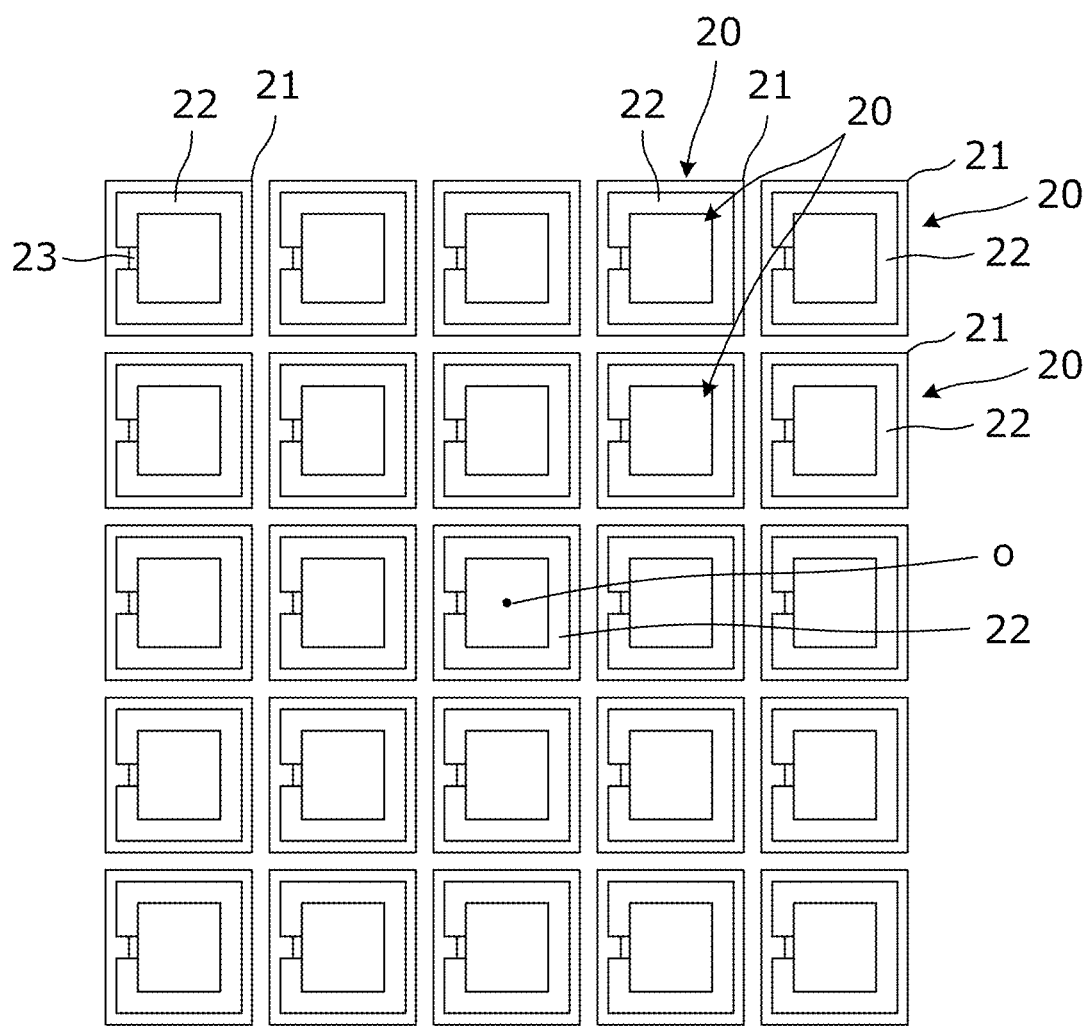
FIG. 13 is a plan view of split ring resonators 20.

FIG. 12 is a front view of an RFID tag reading antenna 102 according to the second embodiment. FIG. 13 is a plan view of the split ring resonators 20.

The RFID tag reading antenna 102 includes one small loop antenna 10 and the plurality of split ring resonators 20. The small loop antenna 10 includes an insulating substrate 11 and a first loop-shaped conductor 12 formed on the substrate 11. The configuration of the small loop antenna 10 is the same as that of the small loop antenna 10 shown in the first embodiment.

According to the exemplary embodiment, each of the plurality of split ring resonators 20 is arranged on a plane parallel to the plane (i.e., the X-Y plane) formed by the first loop-shaped conductor 12 of the small loop antenna 10. In addition, it is noted that the configuration of each split ring resonator 20 is the same as that of the split ring resonator 20 shown in the first embodiment.

In the example shown in FIG. 13, a total of twenty five split ring resonators 20, five in the vertical direction and five in the horizontal direction, are arranged in a two-dimensional array. Second loop-shaped conductors 22 of the plurality of split ring resonators 20 and the first loop-shaped conductor 12 of the small loop antenna 10 are in a parallel relationship. Further, a perpendicular line to the main surface of the substrate 11 passes through a center O of the second loop-shaped conductor 22 of the split ring resonator 20 at the center of the arrangement positions of the plurality of split ring resonators 20 and a center O of the first loop-shaped conductor 12 (see FIG. 1A) of the small loop antenna 10. That is, the plurality of split ring resonators 20 are arranged so that the largest number of the split ring resonators 20 among the plurality of split ring resonators 20 are opposed to the small loop antenna 10 in parallel with the small loop antenna 10.

Each of the plurality of split ring resonators 20 is magnetically coupled to the small loop antenna 10. Further, among the plurality of split ring resonators 20, the split ring resonator 20 close to the RFID tag 200 is coupled to the RFID tag 200.

Figure 14:
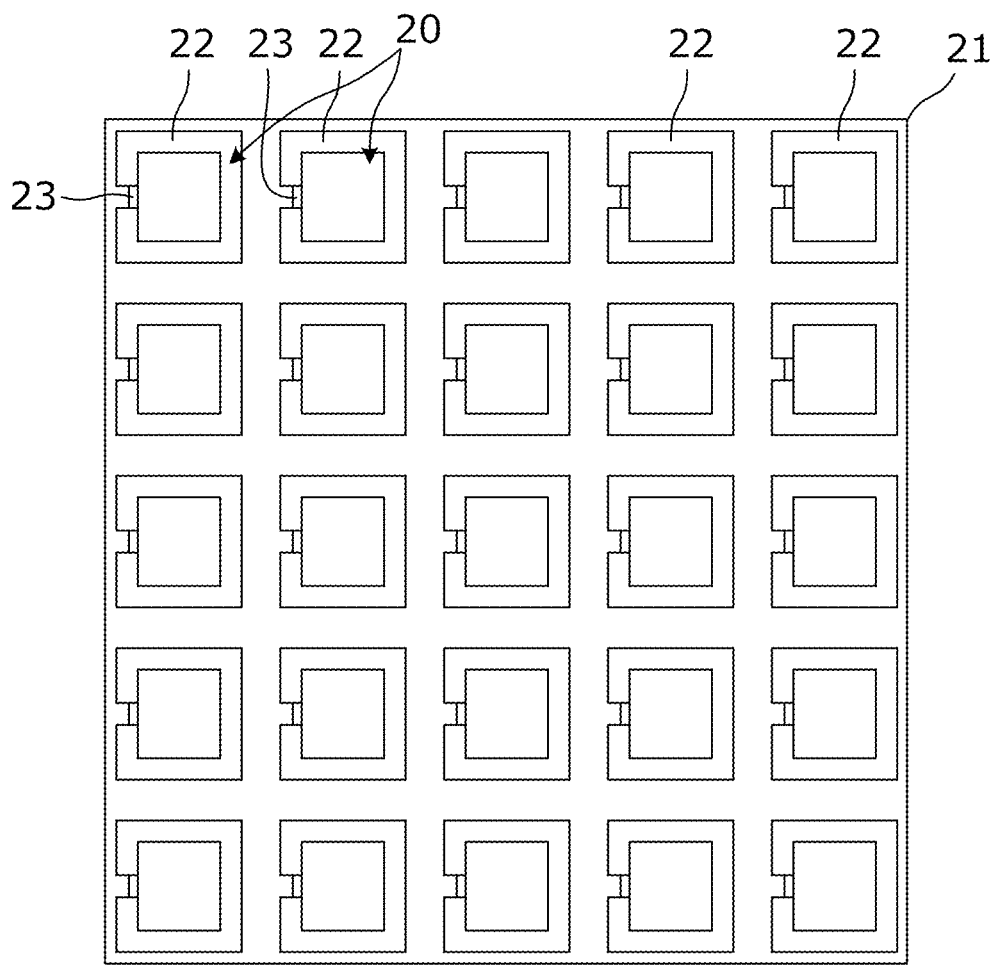
FIG. 14 is a plan view of a split ring resonator array 20A included in the RFID tag reading antenna of the second exemplary embodiment.

FIG. 14 is a plan view of a split ring resonator array 20A included in the RFID tag reading antenna of the present embodiment. Unlike the split ring resonators 20 shown in FIG. 13, a plurality of second loop-shaped conductors 22 are formed on a common substrate 21. In the example shown in FIG. 14, a total of twenty five second loop-shaped conductors 22, five in the vertical direction and five in the horizontal direction, are arranged in a two-dimensional array. The configurations of each second loop-shaped conductor 22 and each capacitor 23 are as shown in FIG. 2. In this way, a plurality of split ring resonators 20 may be configured on a single substrate.

In the examples shown in FIGS. 13 and 14, the plurality of second loop-shaped conductors 22 are arranged by aligning the positions of capacitive loading portions (e.g., capacitor connection portions) of the second loop-shaped conductors 22 in the same direction. However, the positions of the capacitive loading portions (CP shown in FIG. 2) of the second loop-shaped conductors 22 may be in a different direction from these of the adjacent second loop-shaped conductors 22. Further, when the plurality of split ring resonators 20 are arranged so that the capacitive loading portions of the adjacent split ring resonators 20 are not opposed to each other, unnecessary coupling between the adjacent split ring resonators can be suppressed.

Further, in FIGS. 2, 13, and 14, the split ring resonator 20 configured by connecting one capacitor 23 to both ends of one second loop-shaped conductor 22 is shown. However, one split ring resonator may be configured, in such a manner that both ends of halves of the second loop-shaped conductors 22 having, for example, a C-shape or a U-shape are arranged to be opposed to each other, and both the ends are connected via capacitors. That is, two or more capacitors may be inserted into one ring-shaped conductor to form a split ring resonator.

According to the present embodiment, the planes formed by the second loop-shaped conductors 22 of the plurality of split ring resonators 20 are parallel to the plane formed by the first loop-shaped conductor 12 of the small loop antenna 10, so that each split ring resonator 20 and the small loop antenna 10 are strongly coupled to each other. Further, as a result, the entire circumference of the small loop antenna 10 is effectively away from the metal member 300 to which the RFID tag 200 is attached, so that the displacement of the resonance frequency of the small loop antenna 10 due to the proximity of the metal member 300 can be effectively suppressed.

Further, according to the present embodiment, the approximate shape of the second loop-shaped conductor 22 is a quadrangle having sides along two-axis (e.g., the X-axis and Y-axis) directions orthogonal to each other, and the plurality of split ring resonators 20 are arranged in the two-axis directions. Thus, the plurality of split ring resonators 20 can be arranged at high density, and the RFID tag reading antenna can be reduced in size.

Third Exemplary Embodiment

In a third embodiment, another example of a split ring resonator included in an RFID tag reading antenna is shown.

Figure 15A:
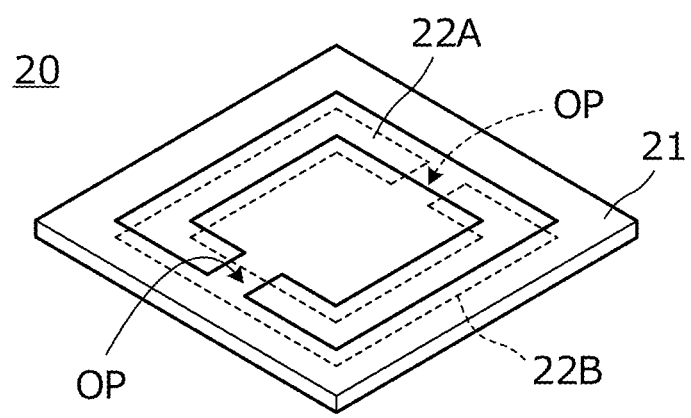
FIGS. 15A and 15B are perspective views of split ring resonators 20 according to a third exemplary embodiment.
Figure 15B:
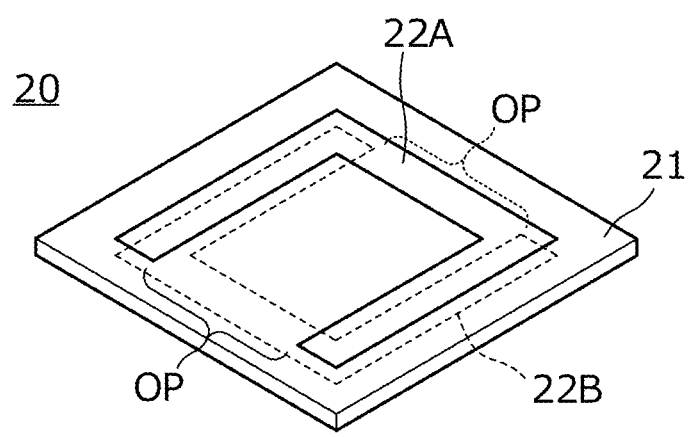
Figure 16:
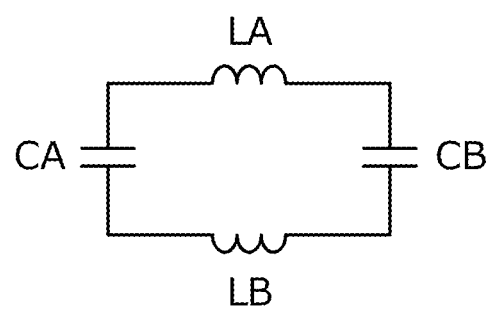
FIG. 16 is an equivalent circuit diagram of the split ring resonators 20 shown in FIGS. 15A and 15B.

FIGS. 15A and 15B are perspective views of a split ring resonators 20 according to the third embodiment. FIG. 16 is an equivalent circuit diagram of the split ring resonators 20 shown in FIGS. 15A and 15B.

As shown in FIGS. 15A and 15B, a second loop-shaped conductor 22A is formed on an upper surface of a substrate 21, and a second loop-shaped conductor 22B is formed on a lower surface of a substrate 21. The substrate 21 is, for example, a glass epoxy substrate, and the second loop-shaped conductors 22A and 22B are each obtained by patterning Cu foil. Unlike the split ring resonator 20 shown in FIG. 7, the second loop-shaped conductor 22A and the second loop-shaped conductor 22B are not connected by an interlayer connecting conductor.

In each of the split ring resonators 20 shown in FIGS. 15A and 15B, the second loop-shaped conductor 22A and the second loop-shaped conductor 22B overlap as a whole in a plan view, and the overall overlapping shape is a square ring shape. An opening OP of the second loop-shaped conductor 22A and an opening OP of the second loop-shaped conductor 22B are formed on opposite sides of the four sides of the square.

Therefore, the equivalent circuit diagram of the split ring resonators 20 shown in FIGS. 15A and 15B is shown as in FIG. 16. In FIG. 16, an inductor LA corresponds to an inductance generated in the second loop-shaped conductor 22A, and an inductor LB corresponds to an inductance generated in the second loop-shaped conductor 22B. Further, capacitors CA and CB correspond to capacitances generated in opposed portions between the second loop-shaped conductor 22A and the second loop-shaped conductor 22B. In this way, the split ring resonator 20 is configured.

Figure 17:
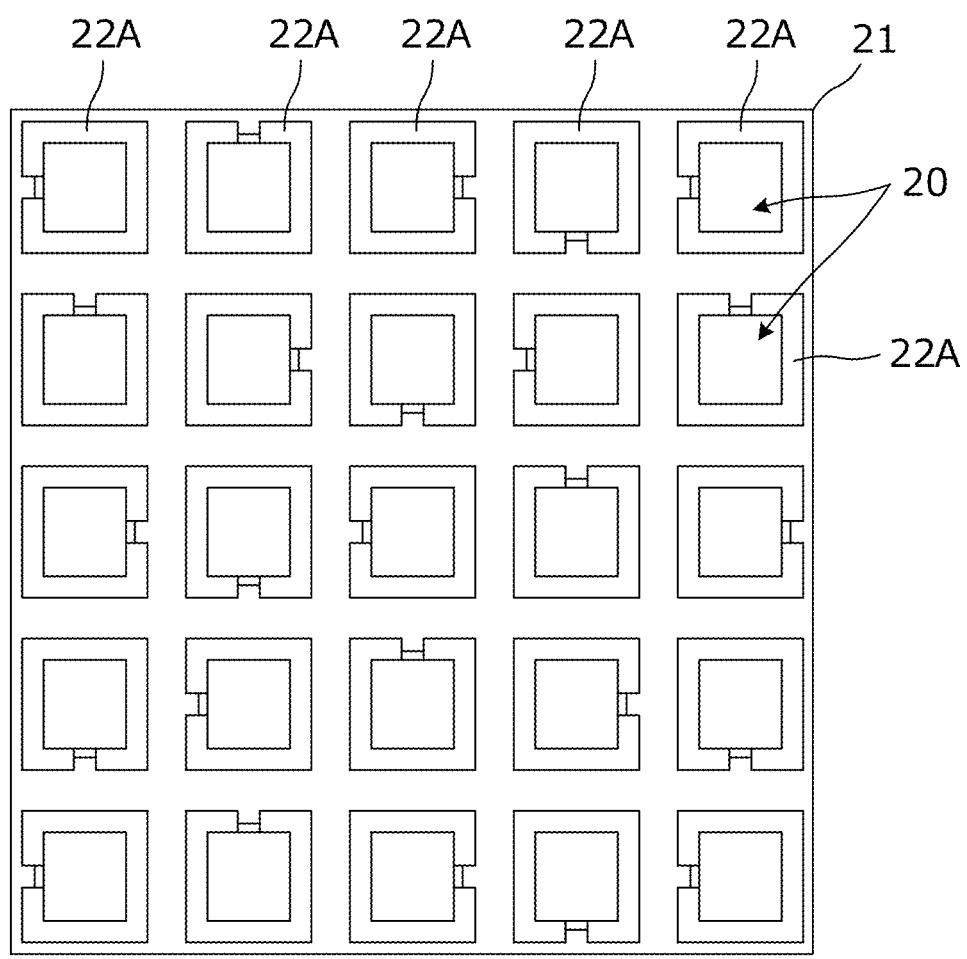
FIG. 17 is a plan view of a split ring resonator array 20A included in an RFID tag reading antenna of the third exemplary embodiment.

FIG. 17 is a plan view of a split ring resonator array 20A included in the RFID tag reading antenna of the present embodiment. The structure of each split ring resonator 20 is as shown in FIG. 15A. That is, the second loop-shaped conductors 22A and 22B having the structures shown in FIG. 15A are arranged on one substrate 21.

In the example shown in FIG. 17, the orientations of second loop-shaped conductors 22A and 22B are determined so that the positions of the openings OP of the second loop-shaped conductors 22A and 22B are not close to (e.g., do not face each other) the positions of the openings OP of the adjacent second loop-shaped conductors 22A and 22B.

In this way, when the capacitance distributed between the two second loop-shaped conductors 22A and 22B is used as the capacitor of the LC resonator, the opening OPs of the adjacent second loop-shaped conductors 22A and 22B are arranged so as not to be close to each other, so that unnecessary coupling between the adjacent split ring resonators can be suppressed.

Although FIGS. 15A, 15B, and 17 each show an example of the split ring resonator including the second loop-shaped conductors 22A and 22B having a square ring shape, a split ring resonator including loop-shaped conductors having a C-shaped circular ring shape may be configured similarly.

Figure 18A:
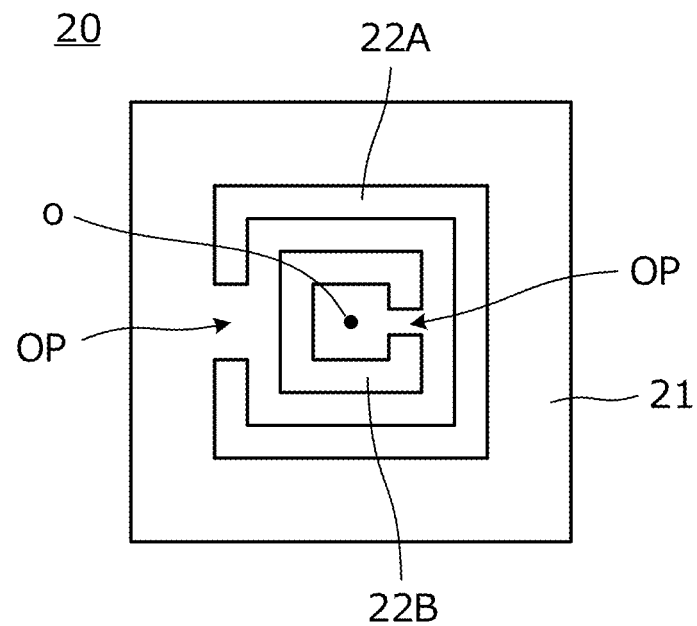
FIGS. 18A and 18B are plan views of other split ring resonators 20 according to the third exemplary embodiment.
Figure 18B:
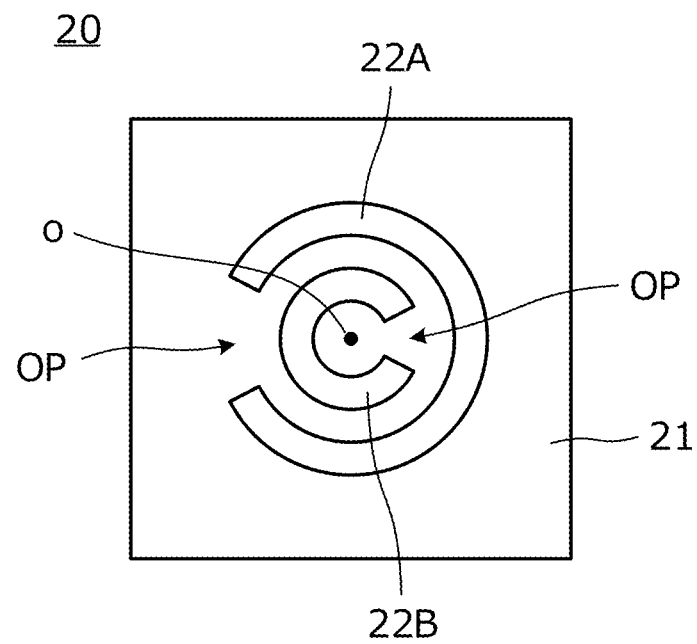

FIGS. 18A and 18B are plan views of other split ring resonators 20 according to the third embodiment. Second loop-shaped conductors 22A and 22B are formed on an upper surface of a substrate 21. The substrate 21 is, for example, a glass epoxy substrate, and the second loop-shaped conductors 22A and 22B are each provided by patterning Cu foil. Unlike the split ring resonators 20 shown in FIGS. 15A and 15B, the second loop-shaped conductors 22A and 22B are formed only on one surface of the substrate 21. In each of the examples of FIGS. 18A and 18B, the second loop-shaped conductor 22B is arranged inside the second loop-shaped conductor 22A in a coaxial relationship in a plan view. An opening OP of the second loop-shaped conductor 22A and an opening OP of the second loop-shaped conductor 22B are formed at positions opposite to each other with respect to a center O of the second loop-shaped conductors 22A and 22B. Therefore, even in the split ring resonators 20 shown in FIGS. 18A and 18B, equivalent circuit diagrams thereof are shown as in FIG. 16.

In this way, the split ring resonator 20 may be formed by forming the two second loop-shaped conductors 22A and 22B on the same plane.

Finally, it is noted that the above description of the exemplary embodiments is illustrative in all respects and not restrictive. As such, those skilled in the art can appropriately make modifications and changes.

The invention claimed is:

1. An RFID tag reading antenna comprising:
a loop antenna including a first loop-shaped conductor having a peripheral length that is less than a ¼ wavelength in a communication frequency for the RFID tag reading antenna; and
a resonator including a second loop-shaped conductor having an opening that is smaller than an opening of the first loop-shaped conductor of the loop antenna and being disposed at a position away from a plane formed by the first loop-shaped conductor by a predetermined distance,
wherein the RFID tag reading antenna is constructed to be coupled to an RFID tag at a position where a distance from the RFID tag to the resonator is less than a distance from the loop antenna to the resonator.

2. The RFID tag reading antenna according to claim 1, wherein the resonator is disposed on a line perpendicular to the plane formed by the first loop-shaped conductor of the loop antenna and passing through a center of the first loop-shaped conductor.

3. The RFID tag reading antenna according to claim 1, wherein the resonator comprises a plurality of resonators.

4. The RFID tag reading antenna according to claim 3, wherein a plane formed by second loop-shaped conductors of the plurality of resonators is disposed in a parallel relationship to the plane formed by the first loop-shaped conductor of the loop antenna.

5. The RFID tag reading antenna according to claim 4, wherein the second loop-shaped conductor comprises a quadrangle shape having sides that extend along two-axis directions orthogonal to each other.

6. The RFID tag reading antenna according to claim 5, wherein the plurality of resonators are arranged in the two-axis directions.

7. The RFID tag reading antenna according to claim 3, wherein a respective opening of each of the plurality of resonators does not face a respective opening of another resonator of the plurality of resonators.

8. The RFID tag reading antenna according to claim 1, wherein the second loop-shaped conductor is a ring-shaped conductor having a slit in a part thereof, and the resonator is a split ring resonator.

9. The RFID tag reading antenna according to claim 8, wherein respective ends of the second loop-shaped conductor are coupled to each other by a capacitor.

10. The RFID tag reading antenna according to claim 1, wherein a magnetic field strength at a position of the resonator is higher than a magnetic field strength at a center position of the loop antenna.

11. The RFID tag reading antenna according to claim 1, wherein the first loop-shaped conductor of the loop antenna comprises a pair of first loop-shaped conductors coupled to each other by a plurality of interlayer connecting conductors.

12. The RFID tag reading antenna according to claim 11, wherein the second loop-shaped conductor of the resonator comprises a pair of rectangular-shaped second loop-shaped conductors coupled to each other by a plurality of interlayer connecting conductors.

13. An RFID tag reading antenna comprising:
a loop antenna including a first loop-shaped conductor; and
a resonator including a second loop-shaped conductor having an opening that is smaller than an opening of the first loop-shaped conductor of the loop antenna,
wherein the second loop-shaped conductor is disposed at a distance from the first loop-shaped conductor, and
wherein the RFID tag reading antenna is constructed to be communicatively coupled to an RFID tag at a position where a distance from the RFID tag to the resonator is less than a distance from the loop antenna to the resonator.

14. The RFID tag reading antenna according to claim 13, wherein the first loop-shaped conductor of the loop antenna has a peripheral length that is less than a ¼ wavelength in a communication frequency for the RFID tag reading antenna.

15. The RFID tag reading antenna according to claim 14, wherein the resonator is disposed at a position away from a plane formed by the first loop-shaped conductor by a predetermined distance.

16. The RFID tag reading antenna according to claim 13, wherein the resonator is disposed on a line perpendicular to a plane formed by the first loop-shaped conductor of the loop antenna and passing through a center of the first loop-shaped conductor.

17. The RFID tag reading antenna according to claim 13, wherein the resonator comprises a plurality of resonators.

18. The RFID tag reading antenna according to claim 17, wherein a plane formed by second loop-shaped conductors of the plurality of resonators is disposed in a parallel relationship to a plane formed by the first loop-shaped conductor of the loop antenna.

19. The RFID tag reading antenna according to claim 18, wherein the second loop-shaped conductor comprises a quadrangle shape having sides that extend along two-axis directions orthogonal to each other.

20. The RFID tag reading antenna according to claim 19, wherein the plurality of resonators are arranged in the two-axis directions.

* * * * *